United States Patent
Kang et al.

(10) Patent No.: US 8,928,976 B2
(45) Date of Patent: Jan. 6, 2015

(54) RESIN COMPOSITION AND OPTICAL FILM FORMED BY USING THE SAME

(71) Applicant: LG Chem, Ltd., Seoul (KR)

(72) Inventors: Byoung-Il Kang, Daejeon (KR); Chang-Hun Han, Daejeon (KR); Dae-Woo Lee, Busan (KR); Jae-Bum Seo, Daejeon (KR); Jung-Tae Park, Jeollanam-do (KR); Eun-Jung Choi, Daejeon (KR); Joon-Sik Kim, Jeollanam-do (KR); Beom-Suk Kim, Daejeon (KR); Nam-Jeong Lee, Daejeon (KR); Sang-Min Kwak, Daejeon (KR); Jun-Geun Um, Daejeon (KR); Suk-Il Youn, Gyeonggi-do (KR); Joong-Hoon Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/954,607

(22) Filed: Jul. 30, 2013

(65) Prior Publication Data

US 2013/0314785 A1    Nov. 28, 2013

Related U.S. Application Data

(63) Continuation of application No. PCT/KR2012/001735, filed on Mar. 9, 2012.

(30) Foreign Application Priority Data

Jun. 1, 2011  (KR) .................. 10-2011-0052908
Nov. 9, 2011  (KR) .................. 10-2011-0116553

(51) Int. Cl.
| | |
|---|---|
| G02B 5/30 | (2006.01) |
| G02F 1/1335 | (2006.01) |
| C08L 33/04 | (2006.01) |
| C08L 33/08 | (2006.01) |
| C08L 33/12 | (2006.01) |
| G02B 1/10 | (2006.01) |
| G02B 1/04 | (2006.01) |

(52) U.S. Cl.
CPC . *G02B 1/105* (2013.01); *G02B 1/04* (2013.01)
USPC .............. 359/483.01; 359/489.07; 349/96; 252/585; 525/191; 525/221; 525/222

(58) Field of Classification Search
USPC ............ 359/485.01, 483.01, 489.07; 349/96; 252/585; 525/191, 221, 222
See application file for complete search history.

(56) References Cited

U.S. PATENT DOCUMENTS

| | | | |
|---|---|---|---|
| 4,874,824 A | 10/1989 | Hallden-Abberton et al. | |
| 8,536,275 B2 * | 9/2013 | Kang et al. ................ | 525/148 |

(Continued)

FOREIGN PATENT DOCUMENTS

| | | |
|---|---|---|
| CN | 102015793 A | 4/2011 |
| EP | 0 264 508 B1 | 7/1991 |

(Continued)

*Primary Examiner* — Ricky D Shafer
(74) *Attorney, Agent, or Firm* — McKenna Long & Aldridge, LLP

(57) ABSTRACT

Provided are a resin composition and an optical film formed by using the same, and more particularly, a resin composition including 85 to 95 parts by weight of a matrix copolymer resin including an alkyl(meth)acrylate-based unit, an acryl-based unit containing a benzene ring, and a (meth)acrylic acid unit, and 5 to 15 parts by weight of a polymer resin having a molecular weight range of 150,000 to 1,000,000 and an optical film formed by using the composition. A resin composition according to the present invention may provide a protective film for a polarizing plate having excellent heat resistance and toughness as well as excellent optical properties, and thus, an optical film formed by using the resin composition of the present invention may be used in information electronic devices such as display devices for various applications.

17 Claims, 1 Drawing Sheet

(56) References Cited

U.S. PATENT DOCUMENTS

| | | | |
|---|---|---|---|
| 8,623,960 B2 * | 1/2014 | Choi et al. | 525/148 |
| 2009/0275718 A1 | 11/2009 | Um et al. | |
| 2009/0292074 A1 * | 11/2009 | Kim et al. | 525/185 |
| 2011/0097561 A1 | 4/2011 | Kang et al. | |
| 2011/0183149 A1 * | 7/2011 | Kang et al. | 428/473.5 |
| 2011/0269910 A1 | 11/2011 | Chun et al. | |
| 2011/0297896 A1 | 12/2011 | Kim et al. | |
| 2014/0015152 A1 | 1/2014 | Choi et al. | |

FOREIGN PATENT DOCUMENTS

| | | |
|---|---|---|
| KR | 10-2010-0104518 A | 9/2010 |
| WO | 2009148260 A2 | 12/2009 |
| WO | 2010079920 A2 | 7/2010 |
| WO | 2012518052 A | 8/2012 |
| WO | 2014501293 A | 1/2014 |

* cited by examiner

RESIN COMPOSITION AND OPTICAL FILM FORMED BY USING THE SAME

This application is a bypass continuation of International Application No. PCT/KR2012/001735 filed Mar. 9, 2012, which claims the priorities of Korean Patent Application Nos. 10-2011-0052908 filed on Jun. 1, 2011, and 10-2011-0116553 filed on Nov. 9, 2011, in the Korean Intellectual Property Office, all of which are incorporated herein by reference.

BACKGROUND OF THE INVENTION

1. Field of the Invention

The present invention relates to a resin composition and an optical film formed by using the same, and more particularly, to a resin composition including 85 to 95 parts by weight of a matrix copolymer resin including an alkyl(meth)acrylate-based unit, an acryl-based unit containing a benzene ring, a (meth)acrylic acid unit, and 5 to 15 parts by weight of a polymer resin having a weight-average molecular weight range of 150,000 to 1,000,000 as well as an optical film formed by using the composition.

2. Description of the Related Art

Liquid crystal displays have become widespread as optical display devices, due to their lower power consumption in comparison to that of a cathode ray tube displays and ease of portability due to their small volume and lightness. In general, a liquid crystal display has a basic configuration in which polarizing plates are disposed at both sides of a liquid crystal cell, and the alignment of the liquid crystal cell may be changed according to the application of an electric field of a driving circuit. As a result, characteristics of transmitted light passing through the polarizing plates may be changed, and visualization of light may thus be realized.

In general, a polarizing plate is composed of various components and first, polarizer protective films as a protective layer are adhered to both sides of a polarizer by means of an adhesive. A drawn aligned hydrophilic polymer such as polyvinyl alcohol (PVA) with adsorbed iodine or a dichroic dye may be used as a polarizer. A polarizer protective film is used in order to increase durability and mechanical properties of the polarizer and at this time, it is important for the protective film to maintain optical properties such as polarizer polarization properties. Therefore, the polarizer protective film requires optical transparency and isotropy, while heat resistance and adhesion with respect to an adhesive/glue may act as an important factor.

A cellulose-based film such as triacetyl cellulose film, a polyester-based film, a polyacrylate-based film, a polycarbonate-based film, a cyclic olefin-based film, or a norbornene-based film may be applied to the polarizer protective film. In particular, a triacetyl cellulose-based film is most widely used.

However, since the triacetyl cellulose-based film has a small in-plane retardation value and a relatively large thickness retardation value, a retardation value may be manifested according to the application of external stress. In particular, since the triacetyl cellulose-based film has many hydrophilic functional groups, a water vapor transmission rate may be high, and as a result, polarizer polarization performance may be degraded due to the occurrence of the deformation of a protective film or the dissociation of iodine ions in the polarizer under heat resistance/humidity resistance conditions. In particular, during a high-temperature, high-humidity test of a liquid crystal display, the occurrence of the deformation of a triacetyl cellulose film may manifest non-uniform optical anisotropy in the film, and as a result, limitations such as a light-leakage phenomenon may be generated.

An acryl-based resin such as poly(meth)acrylate is also known as a material having excellent transparency and optical isotropy, but the acryl-based resin may be fragile because of low external impact resistance and polarization performance of a polarizer may be degraded under high-temperature, high-humidity conditions because of low heat and humidity resistance.

SUMMARY OF THE INVENTION

An aspect of the present invention provides a resin composition which may be used for preparing an optical film having high heat resistance, low dimensional changes with respect to temperature, and improved toughness.

Another aspect of the present invention provides an optical film prepared by using the foregoing resin composition.

According to an aspect of the present invention, there is provided a resin composition including: about 85 to 95 parts by weight of a matrix copolymer resin including an alkyl (meth)acrylate-based unit, an acryl-based unit containing a benzene ring, and a (meth)acrylic acid unit; and about 5 to 15 parts by weight of a polymer resin having a weight-average molecular weight range of about 150,000 to about 1,000,000.

The matrix copolymer resin may include about 70 to 95 parts by weight of the alkyl(meth)acrylate-based unit, about 2 to 10 parts by weight of the acryl-based unit containing a benzene ring, and about 3 to 20 parts by weight of the (meth) acrylic acid unit.

The alkyl(meth)acrylate-based unit may be selected from the group consisting of methyl acrylate, ethyl acrylate, methyl methacrylate, ethyl methacrylate, methyl ethacrylate, and ethyl ethacrylate.

The acryl-based unit containing a benzene ring may be selected from the group consisting of benzyl methacrylate, 1-phenylethyl methacrylate, 2-phenoxyethyl methacrylate, 2-phenylethyl methacrylate, 3-phenylpropyl methacrylate, 3-phenylpropyl acrylate, and 2-phenoxyethyl acrylate.

The (meth)acrylic acid unit may be selected from the group consisting of an acrylic acid, a methacrylic acid, a methyl acrylic acid, a methyl methacrylic acid, an ethyl acrylic acid, an ethyl methacrylic acid, a butyl acrylic acid, and a butyl methacrylic acid.

The polymer resin may include one or more selected from the group consisting of methyl methacrylate, styrene, maleic acid anhydride, and acrylonitrile.

The polymer resin may be at least one selected from the group consisting of poly(methyl methacrylate), a styrene-methyl methacrylate copolymer resin, a styrene-maleic acid anhydride copolymer resin, a styrene-acrylonitrile copolymer resin, and a styrene-acrylonitrile-methyl methacrylate copolymer resin.

The resin composition may be a compound resin formed of the matrix copolymer resin and the polymer resin.

A glass transition temperature of the resin composition may be about 120° C. or more.

According to another aspect of the present invention, there is provided an optical film including the resin composition.

A thermal expansion coefficient of the optical film may be in a range of about 40 ppm/° C. to about 80 ppm/° C.

The optical film may have an in-plane retardation value expressed as the following Equation 1 in a range of about 0 nm to about 5 nm and a thickness retardation value expressed as the following Equation 2 in a range of about −5 nm to about 5 nm:

$$R_{in}=(n_x-n_y)\times d \qquad \text{[Equation 1]}$$

$$R_{th}=(n_z-n_y)\times d \qquad \text{[Equation 2]}$$

where $n_x$ is an in-plane refractive index of the film in a direction having the largest refractive index, $n_y$ is an in-plane refractive index of the film in a direction perpendicular to the $n_x$ direction, $n_z$ is a thickness refractive index, and d is a thickness of the film.

The optical film may not be ruptured by a 10 mm diameter steel ball at a drop height of about 300 mm or more.

The optical film may have a thermal expansion coefficient range of about 40 ppm/° C. to about 80 ppm/° C., may not be ruptured by a 10 mm diameter steel ball at a drop height of about 300 mm or more, and may have an in-plane retardation value expressed as the following Equation 1 in a range of about 0 nm to about 5 nm and a thickness retardation value expressed as the following Equation 2 in a range of about −5 nm to about 5 nm:

$$R_{in}=(n_x-n_y)\times d \quad \text{[Equation 1]}$$

$$R_{th}=(n_z-n_y)\times d \quad \text{[Equation 2]}$$

where $n_x$ is an in-plane refractive index of the film in a direction having the largest refractive index, $n_y$ is an in-plane refractive index of the film in a direction perpendicular to the $n_x$ direction, $n_z$ is a thickness refractive index, and d is a thickness of the film.

The optical film may be a protective film for a polarizing plate.

According to another aspect of the present invention, there is provided a polarizer and a polarizing plate including the optical film included as a protective film on at least one surface of the polarizer.

According to another aspect of the present invention, there is provided a liquid crystal display including the polarizing plate.

Advantageous Effects

A resin composition according to the present invention may provide a protective film for a polarizing plate having excellent heat resistance and toughness as well as excellent optical properties, and thus, an optical film formed by using the resin composition of the present invention may be used in information electronic devices such as display devices for various applications.

DETAILED DESCRIPTION OF THE INVENTION

Figure 1:
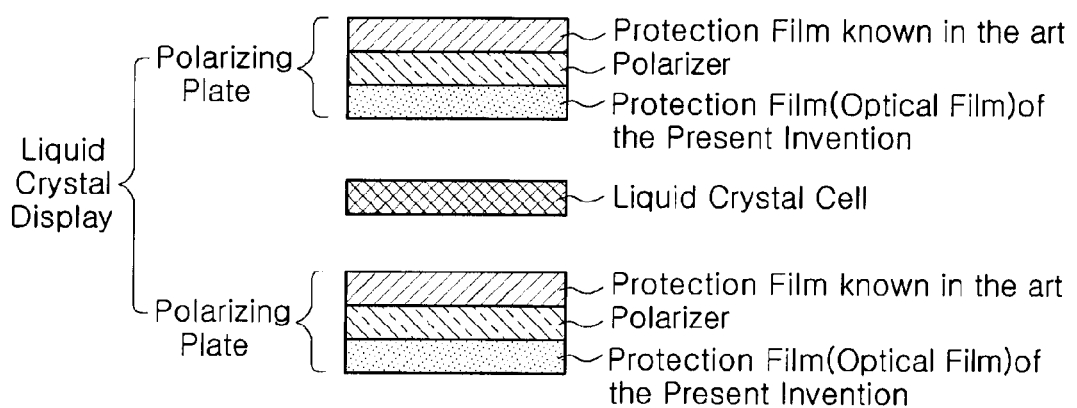
FIG. 1 illustrates a liquid crystal display according to exemplary embodiments of the present invention.
Figure 2:
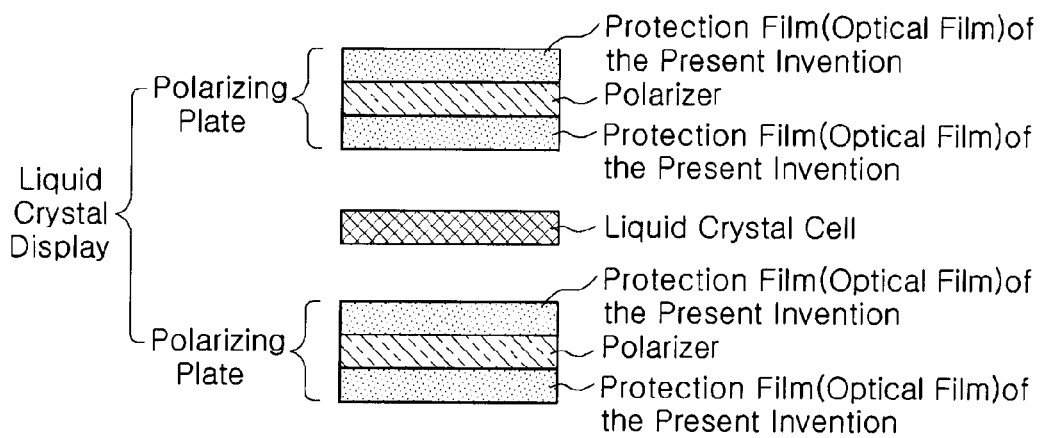
FIG. 2 illustrates a liquid crystal display according to another exemplary embodiments of the present invention.

Hereinafter, embodiments of the present invention will be described in detail. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

According to the present invention, a resin composition including 85 to 95 parts by weight of a matrix copolymer resin including an alkyl(meth)acrylate-based unit, an acryl-based unit containing a benzene ring, and a (meth)acrylic acid unit, and 5 to 15 parts by weight of a polymer resin having a weight-average molecular weight range of 150,000 to 1,000,000 is provided.

The matrix copolymer resin of the present invention includes a (meth)acrylic acid unit together with an acryl-based unit containing a benzene ring based on an alkyl(meth)acrylate-based unit, and as a result, heat resistance may be improved while deformation of the resin may be minimized.

The matrix copolymer resin may include 70 to 95 parts by weight of the alkyl(meth)acrylate-based unit, 2 to 10 parts by weight of the acryl-based unit containing a benzene ring, and 3 to 20 parts by weight of the (meth)acrylic acid unit.

When a content of the acryl-based unit containing a benzene ring is less than 2 parts by weight, retardation may be changed, and when the content of the acryl-based unit containing a benzene ring is more than 10 parts by weight, heat resistance may decrease and changes in retardation may be generated. When a content of the (meth)acrylic acid unit is less than 3 parts by weight, heat resistance may decrease, and when the content of the (meth)acrylic acid unit is greater than 20 parts by weight, polymerization and processing may be difficult. That is, when the content of the acryl-based unit containing a benzene ring is within the foregoing range, optical properties suitable for a protective film may be obtained, miscibility between alkyl(meth)acrylate and (meth)acrylic acid unit may be sufficient, and simultaneously, sufficient heat resistance may be obtained. Also, when the content of the (meth)acrylic acid unit is within the foregoing range, heat resistance may be sufficient and also, a gel may not be formed in the resin.

For example, the matrix copolymer resin may include 79 to 93 parts by weight of the alkyl(meth)acrylate-based unit, 2 to 6 parts by weight of the acryl-based unit containing a benzene ring, and 5 to 15 parts by weight of the (meth)acrylic acid unit.

The matrix copolymer resin may be a block copolymer or a random copolymer, but copolymerization type is not limited thereto.

In the present specification, an "alkyl(meth)acrylate-based unit" denotes that both an "alkyl acrylate-based unit" and an "alkyl methacrylate-based unit" may be included. An alkyl moiety of the alkyl(meth)acrylate-based unit may have a carbon number of 1 to 10 and may be at least one selected from the group consisting of methyl acrylate, ethyl acrylate, methyl methacrylate, ethyl methacrylate, methyl ethacrylate, and ethyl ethacrylate. The alkyl, for example, may be a methyl group or ethyl group, but the alkyl is not limited thereto. For example, the alkyl(meth)acrylate-based unit may be methyl methacrylate.

In the matrix copolymer resin, the acryl-based unit containing a benzene ring acts to allow the resin composition according to the present invention to have in-plane or thickness retardation and a photoelastic coefficient for a polarizer protective film and acts to provide miscibility between the alkyl(meth)acrylate and (meth)acrylic acid units. The acryl-based unit containing a benzene ring may be substituted with an aryl group having a carbon number of 6-40, an arylalkyl group having a carbon number of 6-40, an aryloxy group having a carbon number of 6-40, or aryloxyalkyl group having a carbon number of 6-40, and for example, (meth)acrylate substituted with an arylalkyl group having a carbon number of 6-15, an aryloxy group having a carbon number of 6-10, or aryloxyalkyl group having a carbon number of 6-15 may be used in terms of transparency.

Particular examples of the acryl-based unit containing a benzene ring may be selected from the group consisting of benzyl methacrylate, 1-phenylethyl methacrylate, 2-phenoxyethyl methacrylate, 2-phenylethyl methacrylate, 3-phenylpropyl methacrylate, 3-phenylpropyl acrylate, and 2-phenoxyethyl acrylate, and the benzyl methacrylate, for example, may be used among these examples.

In the matrix copolymer resin, the (meth)acrylic acid unit acts to allow the acryl-based copolymer resin according to the present invention to have sufficient heat resistance. The (meth)acrylic acid unit may be substituted or non-substituted with an alkyl group having a carbon number of 1 to 5. Examples of the (meth)acrylic acid unit may be an acrylic acid, a methacrylic acid, a methyl acrylic acid, a methyl methacrylic acid, an ethyl acrylic acid, an ethyl methacrylic acid, a butyl acrylic acid, and a butyl methacrylic acid, and the methacrylic acid, for example, may be used among these examples.

A weight-average molecular weight of the matrix copolymer resin may be in a range of 100,000 to 500,000 in terms of heat resistance, processability, and productivity, and for example, may be in a range of 50,000 to 200,000.

The resin composition of the present invention may further include a polymer resin having a weight-average molecular weight range of 150,000 to 1,000,000 in the matrix copolymer resin and a weight ratio therebetween may be 85 to 95 parts by weight of the matrix copolymer resin: 5 to 15 parts by weight of the polymer resin.

When the weight-average molecular weight of the polymer resin in the present invention is less than 150,000, overall resin toughness may decrease, and when the weight-average molecular weight of the polymer resin is greater than 1,000,000, kneading and dispersion with respect to the matrix resin may be difficult. When an amount of the polymer resin is less than 5 parts by weight, strengthening of the overall resin toughness may not be sufficient, and when the amount of the polymer resin is greater than 15 parts by weight, retardation may be changed and transparency may decrease.

The polymer resin has miscibility with the matrix copolymer resin within a limited range and may maintain transparency, and may include one or more selected from the group consisting of methyl methacrylate, styrene, maleic acid anhydride, and acrylonitrile, for example, may be a copolymer including methyl methacrylate or a styrene-based copolymer including anhydride, and in more detail, may be at least one selected from the group consisting of poly(methyl methacrylate), a styrene-methyl methacrylate copolymer resin, a styrene-maleic acid anhydride copolymer resin, a styrene-acrylonitrile copolymer resin, and a styrene-acrylonitrile-methyl methacrylate copolymer resin.

When the foregoing miscible polymer resin is added to the matrix copolymer resin, a glass transition temperature of an optical film prepared by the resulting resin composition may increase, and as a result, an optical film having high heat resistance and a low resin deformation index may be prepared. Also, when the optical film is used in a preparation process of a polarizing plate, excellent workability may be obtained.

The resin composition may be a compound resin formed of the matrix copolymer resin and the polymer resin.

A glass transition temperature of the resin composition according to the present invention may be 120° C. or more and for example, may be 130° C. or more. When the glass transition temperature of the resin composition is less than 120° C., deformation of the film may be facilitated under high-temperature, high-humidity conditions due to insufficient heat resistance, and as a result, compensation characteristics of the film may be non-uniform.

Any method known to the art may be used during the preparation of the optical film according to the present invention. In particular, a solution cast method or extrusion method may be used, and in some cases, a conditioner may be added.

A method of preparing an optical film according to the present invention may further include uniaxial or biaxial drawing of the film. Machine direction (MD) drawing or transverse direction (TD) drawing may respectively be performed, or both may be performed in the drawing process. In the case that both machine direction drawing and transverse direction drawing are performed, a first drawing process is first performed and then further drawing may be performed, or both drawing processes may be performed simultaneously. The drawing processes may be performed in a single operation and may also be performed through multiple operations.

The drawing process may be performed in a temperature range from (Tg−20° C.) to (Tg+30° C.) where Tg denotes the glass transition temperature of the copolymer resin. The temperature range starts from a temperature at which a storage modulus of the copolymer resin starts to decrease and becomes smaller than a loss modulus and ends at a temperature at which the orientation of a polymer chain is relaxed and disappears. The glass transition temperature may be measured by a differential scanning calorimeter (DSC). The temperature during the drawing process may be, for example, the glass transition temperature of the film.

A drawing operation may be performed at a drawing speed range of 1 mm/min to 100 mm/min with respect to a small drawing machine (universal testing machine, Zwick 2010) and may be performed at a drawing speed range of 0.1 m/min to 2 m/min with respect to a pilot drawing machine. The film may be drawn by applying a draw ratio of 5% to 300%.

Retardation characteristics of the optical film according to the present invention may be adjusted through uniaxial or biaxial drawing by means of the foregoing method.

An optical film formed by using the resin composition of the present invention may have a thickness range of 40 μm to 80 μm, but the thickness range is not limited thereto. A degree of optical transmission of the optical film is 90% or more, and a haze value is 2.5% or less and may be 1% or less. When the degree of optical transmission of the optical film is less than 90% and the haze value is greater than 2.5%, brightness of a liquid crystal display using the foregoing optical film may decrease.

In the optical film subjected to the drawing, an in-plane retardation value expressed as the following Equation 1 may be in a range of 0 nm to 5 nm and a thickness retardation value expressed as the following Equation 2 may be in a range of −5 nm to 5 nm.

$$R_{in}=(n_x-n_y)\times d \qquad \text{[Equation 1]}$$

$$R_{th}=(n_z-n_y)\times d \qquad \text{[Equation 2]}$$

where $n_x$ is an in-plane refractive index of the film in a direction having the largest refractive index, $n_y$ is an in-plane refractive index of the film in a direction perpendicular to the $n_x$ direction, $n_z$ is a thickness refractive index, and d is a thickness of the film.

A thermal expansion coefficient of the optical film according to the present invention may be in a range of 40 ppm/° C. to 80 ppm/° C., and the lower the thermal expansion coefficient is, the better the optical film may be. The lower limit thereof is not limited to 40 ppm/° C. When the thermal expansion coefficient is greater than 80 ppm/° C., bending may occur during lamination of a polarizing plate. The thermal expansion coefficient may be generally measured by using a so-called "thermomechanical analyzer (TMA)" in which a degree of expansion may be measured while a temperature is increased after a predetermined force is applied to the film.

The optical film according to the present invention may not be ruptured by a 10 mm diameter steel ball at a drop height of 300 mm or more, and this is denoted as a "falling ball impact height" in the present invention. At this time, based on a rectangular film used having a width and length of 100 mm each and a thickness of 60 μm, a height, at which the film begins to rupture, is measured while the film is tightly fixed and the ball is dropped thereon.

Further, the optical film according to the present invention, for example, may have a thermal expansion coefficient range of 40 ppm/° C. to 80 ppm/° C., may not be ruptured by a 10 mm diameter steel ball at a drop height of 300 mm or more, and may have an in-plane retardation value expressed as Equation 1 in a range of 0 nm to 5 nm and a thickness retardation value expressed as Equation 2 in a range of −5 nm to 5 nm.

The optical film according to the present invention may be prepared for the application of a protective film for a polarizing plate.

According to the present invention, a polarizer, a polarizing plate including the optical film of the present invention included as a protective film on at least one surface of the polarizer, and a liquid crystal display including the polarizing plate are provided.

For example, the present invention may provide a liquid crystal display including a light source, a first polarizing plate, a liquid crystal cell, and a second polarizing plate in a sequentially stacked state, and including the optical film according to the present invention as a protective film of at least one of the first polarizing plate and the second polarizing plate.

The liquid crystal cell includes a liquid crystal layer, a substrate able to support the liquid crystal layer, and an electrode layer for applying a voltage to the liquid crystal layer. At this time, the polarizing plate according to the present invention may be applied to all liquid crystal modes such as an in-plane switching mode (IPS mode), a vertically aligned mode (VA mode), an optically compensated birefringence mode (OCB mode), a twisted nematic mode (TN mode), and a fringe field switching mode (FFS mode).

The optical film according to the present invention may be included on both sides of the polarizer. Also, the optical film is provided on any one side of the polarizer and a polarizer protective film known in the art, for example, a triacetyl cellulose (TAC) film, a polyethylene terephthalate (PET) film, a cyclo-olefin polymer (COP) film, a polycarbonate (PC) film, or a polynorbornene-based film, may be provided on the other side thereof.

Adhesion between the polarizer and the optical film may be performed by using an adhesive layer. An adhesive usable during the lamination of the optical film and the polarizer is not particularly limited so long as the adhesive is known in the art. For example, the adhesive may be a one-component type or two-component type polyvinyl alcohol (PVA)-based adhesive, a polyurethane-based adhesive, an epoxy-based adhesive, a styrene butadiene rubber (SBR)-based adhesive, or a hot-melt type adhesive. However, the adhesive is not limited thereto. Among the foregoing adhesives, the polyvinyl alcohol-based adhesive, for example, may be used.

The adhesion between the polarizer and the optical film may be performed by first coating the adhesive on a surface of the polarizer protective film or a PVA film as the polarizer by using a roll coater, a gravure coater, a bar coater, a knife coater, or a capillary coater, and by a method of laminating the protective film and the polarizer by hot pressing with a laminating roll or pressing at room temperature before the adhesive is completely dried. When the hot-melt type adhesive is used, a hot-pressing roll must be used.

When the polyurethane-based adhesive is used, a polyurethane-based adhesive prepared by using an aliphatic isocyanate-based compound, which is not yellowed by exposure to light, may be used. When a one-component type or two-component type adhesive for a dry laminate or a adhesive having relatively low reactivity with isocyanate and a hydroxy group is used, a solution-type adhesive diluted with an acetate-based solvent, a ketone-based solvent, an ether-based solvent, or an aromatic-based solvent may be used. At this time, viscosity of the adhesive may be a low value of 5,000 cps or less. The foregoing adhesives may have a degree of optical transmission of 90% or more in a wavelength range of 400 nm to 800 nm as well as excellent storage stability. An adhesive may also be used when the adhesive exhibits sufficient adhesion.

EXAMPLES

1. Preparation of Optical Film Using Acryl-Based Copolymer Resin

Example 1

A matrix copolymer resin was prepared by using 85 parts by weight of methyl methacrylate, 5 parts by weight of benzyl methacrylate, and 10 parts by weight of a methacrylic acid, glass transition temperature and weight-average molecular weight were measured, and the results thereof are presented in Table 1. 10 parts by weight of a methyl methacrylate polymer resin having a weight-average molecular weight of 150,000 for 90 parts by weight of the matrix copolymer resin were added to prepare a final resin through a melting method, and an optical film was prepared with the final resin composition thus prepared by using a melt extrusion method and drawing was then performed at a glass transition temperature. An in-plane retardation value/thickness retardation value of the optical film thus prepared and a linear thermal expansion coefficient and a falling ball impact height of the film were measured, and the results thereof are presented in Table 1.

Example 2

An optical film was prepared in the same manner as Example 1 except that 10 parts by weight of a styrene-maleic acid anhydride polymer resin having a weight-average molecular weight of 200,000 for 90 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 1.

Example 3

An optical film was prepared in the same manner as Example 1 except that 10 parts by weight of a styrene-methyl methacrylate polymer resin having a weight-average molecular weight of 180,000 for 90 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 1.

Example 4

An optical film was prepared in the same manner as Example 1 except that 10 parts by weight of a styrene-acrylonitrile polymer resin having a weight-average molecular weight of 1,000,000 for 90 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 1.

Example 5

An optical film was prepared in the same manner as Example 1 except that 10 parts by weight of a styrene-methyl methacrylate-acrylonitrile polymer resin having a weight-average molecular weight of 240,000 for 90 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 1.

Example 6

An optical film was prepared in the same manner as Example 1 except that 5 parts by weight of a styrene-methyl methacrylate polymer resin having a weight-average molecular weight of 180,000 for 95 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 1.

Example 7

An optical film was prepared in the same manner as Example 1 except that 15 parts by weight of a styrene-methyl methacrylate polymer resin having a weight-average molecular weight of 180,000 for 85 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 1.

Example 8

An optical film was prepared in the same manner as Example 1 except that a matrix copolymer resin was prepared by using 82 parts by weight of methyl methacrylate, 3 parts by weight of benzyl methacrylate, and 15 parts by weight of a methacrylic acid, and 10 parts by weight of a methyl methacrylate polymer resin having a weight-average molecular weight of 150,000 for 90 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 1.

Example 9

An optical film was prepared in the same manner as Example 1 except that a matrix copolymer resin was prepared by using 82 parts by weight of methyl methacrylate, 3 parts by weight of benzyl methacrylate, and 15 parts by weight of a methacrylic acid, and 10 parts by weight of a styrene-acrylonitrile polymer resin having a weight-average molecular weight of 1,000,000 for 90 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 1.

Example 10

An optical film was prepared in the same manner as Example 1 except that a matrix copolymer resin was prepared by using 82 parts by weight of methyl methacrylate, 3 parts by weight of benzyl methacrylate, and 15 parts by weight of a methacrylic acid, and 15 parts by weight of a styrene-acrylonitrile polymer resin having a weight-average molecular weight of 1,000,000 for 85 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 1.

Comparative Example 1

An optical film was prepared in the same manner as Example 1 except that 100 parts by weight of the matrix copolymer resin were used to prepare a final resin through a melting method. An in-plane retardation value/thickness retardation value of the optical film thus prepared and a linear thermal expansion coefficient and a falling ball impact height of the film were measured, and the results thereof are presented in Table 2.

Comparative Example 2

An optical film was prepared in the same manner as Example 1 except that 20 parts by weight of a methyl methacrylate polymer resin having a weight-average molecular weight of 150,000 for 80 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 2.

Comparative Example 3

An optical film was prepared in the same manner as Example 1 except that 20 parts by weight of a styrene-maleic acid anhydride polymer resin having a weight-average molecular weight of 200,000 for 80 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 2.

Comparative Example 4

An optical film was prepared in the same manner as Example 1 except that 20 parts by weight of a styrene-methyl methacrylate polymer resin having a weight-average molecular weight of 180,000 for 80 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 2.

Comparative Example 5

An optical film was prepared in the same manner as Example 1 except that 20 parts by weight of a styrene-acrylonitrile polymer resin having a weight-average molecular weight of 1,000,000 for 80 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 2.

Comparative Example 6

An optical film was prepared in the same manner as Example 1 except that 20 parts by weight of a styrene-methyl methacrylate-acrylonitrile polymer resin having a weight-average molecular weight of 240,000 for 80 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 2.

Comparative Example 7

An optical film was prepared in the same manner as Example 1 except that 30 parts by weight of a styrene-methyl methacrylate polymer resin having a weight-average molecular weight of 180,000 for 70 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 2.

Comparative Example 8

An optical film was prepared in the same manner as Example 1 except that a matrix copolymer resin was prepared by using 82 parts by weight of methyl methacrylate, 3 parts by weight of benzyl methacrylate, and 15 parts by weight of a methacrylic acid, and 30 parts by weight of a methyl methacrylate polymer resin having a weight-average molecular weight of 180,000 for 70 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 2.

Comparative Example 9

An optical film was prepared in the same manner as Example 1 except that a matrix copolymer resin was prepared by using 82 parts by weight of methyl methacrylate, 3 parts by weight of benzyl methacrylate, and 15 parts by weight of a methacrylic acid, and 4 parts by weight of a methyl methacrylate polymer resin having a weight-average molecular weight of 180,000 for 96 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 2.

Comparative Example 10

An optical film was prepared in the same manner as Example 1 except that a matrix copolymer resin was prepared by using 82 parts by weight of methyl methacrylate, 3 parts by weight of benzyl methacrylate, and 15 parts by weight of a methacrylic acid, and 4 parts by weight of a styrene-methyl methacrylate-acrylonitrile polymer resin having a weight-average molecular weight of 240,000 for 96 parts by weight of the matrix copolymer resin were added to prepare a final resin through a melting method. An in-plane retardation value/thickness retardation value of the optical film thus prepared and a linear thermal expansion coefficient and a falling ball impact height of the film were measured, and the results thereof are presented in Table 2.

2. Evaluation of Physical Properties According to Resin Composition (1) Evaluation Method 1) Glass Transition Temperature (Tg, °C.): measured by using a differential scanning calorimeter (DSC) by TA instruments.

2) Retardation value ($R_{in}/R_{th}$): measured by using the AxoScan by Axometrics, Inc., after drawing at a glass transition temperature of a film.

3) Thermal Expansion Coefficient (ppm/°C.): measured by using a thermomechanical analyzer (TMA), a linear thermal expansion coefficient measuring device, by TA instruments, after biaxially drawing a film.

4) Falling Ball Impact Height of Film (mm): measured height at which rupture began when a 10 mm diameter steel ball was dropped on a tightly stretched rectangular film having a width and length of 100 mm each and a thickness of 60 μm.

(2) Evaluation Result

TABLE 1

| Example | 1 | 2 | 3 | 4 | 5 | 6 | 7 | 8 | 9 | 10 |
|---|---|---|---|---|---|---|---|---|---|---|
| Physical properties of matrix resin | | | | | | | | | | |
| Glass transition temperature (Tg), °C. | 132 | 132 | 132 | 132 | 132 | 132 | 132 | 138 | 138 | 138 |

TABLE 1-continued

| Example | 1 | 2 | 3 | 4 | 5 | 6 | 7 | 8 | 9 | 10 |
|---|---|---|---|---|---|---|---|---|---|---|
| Weight-average molecular weight (Mw) | 90,000 | 90,000 | 90,000 | 90,000 | 90,000 | 90,000 | 90,000 | 90,000 | 90,000 | 90,000 |
| Physical properties of polymer resin | | | | | | | | | | |
| Weight-average molecular weight (Mw) | 150,000 | 200,000 | 180,000 | 1,000,000 | 240,000 | 180,000 | 180,000 | 150,000 | 1,000,000 | 1,000,000 |
| Physical properties of film | | | | | | | | | | |
| Glass transition temperature (Tg), °C. | 130 | 135 | 130 | 130 | 130 | 131 | 128 | 135 | 136 | 134 |
| Film retardation ($R_{in}/R_{th}$) | 0.1/0.1 | 3.0/4.0 | 0.7/1.2 | 1.3/2.2 | 1.6/2.7 | 0.3/0.6 | 2.8/3.6 | 0.1/−1.0 | 0.6/1.2 | 1.8/3.2 |
| Thermal expansion coefficient (ppm/°C.) | 64 | 69 | 64 | 67 | 65 | 64 | 72 | 55 | 56 | 59 |
| Falling ball impact height (mm) | 440 | 400 | 500 | 800 | 620 | 440 | 650 | 410 | 720 | 820 |

TABLE 2

| Comparative Example | 1 | 2 | 3 | 4 | 5 | 6 | 7 | 8 | 9 | 10 |
|---|---|---|---|---|---|---|---|---|---|---|
| Physical properties of matrix resin | | | | | | | | | | |
| Glass transition temperature (Tg), °C. | 132 | 132 | 132 | 132 | 132 | 132 | 132 | 138 | 138 | 138 |
| Weight-average molecular weight (Mw) | 90,000 | 90,000 | 90,000 | 90,000 | 90,000 | 90,000 | 90,000 | 90,000 | 90,000 | 90,000 |
| Physical properties of polymer resin | | | | | | | | | | |
| Weight-average molecular weight (Mw) | — | 150,000 | 200,000 | 180,000 | 1,000,000 | 240,000 | 180,000 | 180,000 | 180,000 | 240,000 |
| Physical properties of film | | | | | | | | | | |
| Glass transition temperature (Tg), °C. | 132 | 127 | 138 | 127 | 128 | 130 | 123 | 130 | 136 | 134 |
| Film retardation ($R_{in}/R_{th}$) | 0.8/−3.6 | 4.1/5.2 | 7.1/8.0 | 4.7/6.2 | 4.3/5.2 | 3.6/5.7 | 8.3/10.4 | 6.1/9.0 | 1.3/2.2 | 1.6/2.7 |
| Thermal expansion coefficient (ppm/°C.) | 62 | 75 | 82 | 80 | 87 | 81 | 88 | 75 | 57 | 56 |
| Falling ball impact height (mm) | 300 | 640 | 340 | 650 | 1100 | 820 | 1440 | 710 | 370 | 380 |

When an optical film was prepared in the same manner as Example 1 except that a methyl methacrylate polymer resin having a weight-average molecular weight of 130,000 was used, other physical properties were the same and a falling ball impact height was almost similar in comparison to Example 1. When a methyl methacrylate polymer resin having a weight-average molecular weight of 80,000 was used, a falling ball impact height significantly decreased to 230 mm.

On the other hand, when a styrene-acrylonitrile copolymer resin having a weight-average molecular weight of 1,300,000 was used as a polymer resin, dispersion was not facilitated and transparency was decreased in terms of miscibility.

Other types of polymers in addition to the polymers disclosed in the present invention exhibited limitations in miscibility due to the occurrence of a large amount of haze even in the case where the molecular weights thereof corresponded to a range of the present invention, and for example, it may be confirmed that when polystyrene having a weight-average molecular weight of 230,000 was kneaded as a polymer resin, the resin became opaque due to the immediate occurrence of haze.

While the present invention has been shown and described in connection with the embodiments, it will be apparent to those skilled in the art that modifications and variations can be made without departing from the spirit and scope of the invention as defined by the appended claims.

What is claimed is:

1. A resin composition comprising:
    about 85 to 95 parts by weight of a matrix copolymer resin including an alkyl(meth)acrylate-based unit, an acryl-based unit containing a benzene ring, and a (meth) acrylic acid unit; and
    about 5 to 15 parts by weight of a polymer resin having a molecular weight range of about 150,000 g/mol to about 1,000,000 g/mol.

2. The resin composition of claim 1, wherein the matrix copolymer resin comprises about 70 to 95 parts by weight of the alkyl(meth)acrylate-based unit, about 2 to 10 parts by weight of the acryl-based unit containing a benzene ring, and about 3 to 20 parts by weight of the (meth)acrylic acid unit.

3. The resin composition of claim 1, wherein the alkyl (meth)acrylate-based unit is selected from the group consisting of methyl acrylate, ethyl acrylate, methyl methacrylate, ethyl methacrylate, methyl ethacrylate, and ethyl ethacrylate.

4. The resin composition of claim 1, wherein the acryl-based unit containing a benzene ring is selected from the group consisting of benzyl methacrylate, 1-phenylethyl methacrylate, 2-phenoxyethyl methacrylate, 2-phenylethyl methacrylate, 3-phenylpropyl methacrylate, 3-phenylpropyl acrylate, and 2-phenoxyethyl acrylate.

5. The resin composition of claim 1, wherein the (meth) acrylic acid unit is selected from the group consisting of an acrylic acid, a methacrylic acid, a methyl acrylic acid, a methyl methacrylic acid, an ethyl acrylic acid, an ethyl methacrylic acid, a butyl acrylic acid, and a butyl methacrylic acid.

6. The resin composition of claim 1, wherein the polymer resin comprises one or more selected from the group consisting of methyl methacrylate, styrene, maleic acid anhydride, and acrylonitrile.

7. The resin composition of claim 1, wherein the polymer resin is at least one selected from the group consisting of poly(methyl methacrylate), a styrene-methyl methacrylate copolymer resin, a styrene-maleic acid anhydride copolymer resin, a styrene-acrylonitrile copolymer resin, and a styrene-acrylonitrile-methyl methacrylate copolymer resin.

8. The resin composition of claim 1, wherein the resin composition is a compound resin formed of the matrix copolymer resin and the polymer resin.

9. The resin composition of claim 1, wherein a glass transition temperature of the resin composition is about 120° C. or more.

10. An optical film comprising the resin composition of claim 1.

11. The optical film of claim 10, wherein a thermal expansion coefficient of the optical film is in a range of about 40 ppm/° C. to about 80 ppm/° C.

12. The optical film of claim 10, wherein the optical film has an in-plane retardation value expressed as the following Equation 1 in a range of about 0 nm to about 5 nm and a thickness retardation value expressed as the following Equation 2 in a range of about −5 nm to about 5 nm:

$$R_{in}=(n_x-n_y)\times d \quad \text{[Equation 1]}$$

$$R_{th}=(n_z-n_y)\times d \quad \text{[Equation 2]}$$

where $n_x$ is an in-plane refractive index of the film in a direction having a largest refractive index, $n_y$ is an in-plane refractive index of the film in a direction perpendicular to the $n_x$ direction, $n_z$ is a thickness refractive index, and d is a thickness of the film.

13. The optical film of claim 10, wherein the optical film is not ruptured by a 10 mm diameter steel ball at a drop height of about 300 mm or more.

14. The optical film of claim 10, wherein the optical film has a thermal expansion coefficient range of about 40 ppm/° C. to about 80 ppm/° C., is not ruptured by a 10 mm diameter steel ball at a drop height of about 300 mm or more, and has an in-plane retardation value ($R_{in}$) expressed as Equation 1 in a range of about 0 nm to about 5 nm and a thickness retardation value ($R_{th}$) expressed as Equation 2 in a range of about −5 nm to about 5 nm:

$$R_{in}=(n_x-n_y)\times d \quad \text{[Equation 1]}$$

$$R_{th}=(n_z-n_y)\times d \quad \text{[Equation 2]}$$

where $n_x$ is an in-plane refractive index of the film in a direction having a largest refractive index, $n_y$ is an in-plane refractive index of the film in a direction perpendicular to the $n_x$ direction, $n_z$ is a thickness refractive index, and d is a thickness of the film.

15. The optical film of claim 10, wherein the optical film is a protective film for a polarizing plate.

16. A polarizing plate comprising the optical film of claim 10 included as a protection film on at least one surface of a polarizer.

17. A liquid crystal display comprising the polarizing plate of claim 16.

* * * * *